(12) United States Patent
Nakatsuka et al.

(10) Patent No.: US 8,291,770 B2
(45) Date of Patent: Oct. 23, 2012

(54) OIL PASSAGE FORMING MEMBER FITTED WITH HYDRAULIC PRESSURE SENSOR

(75) Inventors: Masahiko Nakatsuka, Saitama (JP); Masaki Cho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 919 days.

(21) Appl. No.: 12/388,197

(22) Filed: Feb. 18, 2009

(65) Prior Publication Data
US 2009/0205734 A1    Aug. 20, 2009

(30) Foreign Application Priority Data
Feb. 20, 2008    (JP) ................................. 2008-039403

(51) Int. Cl.
*G01L 7/00* (2006.01)
(52) U.S. Cl. ......................................................... 73/756
(58) Field of Classification Search .................. None
See application file for complete search history.

(56) References Cited

U.S. PATENT DOCUMENTS
2011/0233022 A1*   9/2011   Fujimoto et al. ......... 192/48.601
2011/0233024 A1*   9/2011   Fujimoto et al. ........... 192/85.01

FOREIGN PATENT DOCUMENTS
| JP | 6-117327 A | 4/1994 |
| JP | 2005-248838 A | 9/2005 |
| JP | 2005-263143 A | 9/2005 |

* cited by examiner

*Primary Examiner* — Andre Allen
(74) *Attorney, Agent, or Firm* — Birch, Stewart, Kolasch & Birch, LLP (57) ABSTRACT

Detecting a hydraulic pressure condition at a supplied part while reducing the cost of an oil passage forming member provided with an oil passage for conducting oil to the supplied part. In a right cover which is provided with a bent oil passage for conducting oil to a hydraulic type running clutch and which is fitted with the hydraulic pressure sensor, the oil passage is composed of a first hole and a second hole intersecting the first hole so as to constitute a bent passage part. The second hole, which is one of the first hole and the second hole, has an aperture end part with the aperture end part being closed with the hydraulic pressure sensor. The bent passage part is a bent passage part, located at a position nearest to a hydraulic pressure chamber of the running clutch, of the oil passage.

20 Claims, 4 Drawing Sheets

OIL PASSAGE FORMING MEMBER FITTED WITH HYDRAULIC PRESSURE SENSOR

CROSS-REFERENCE TO RELATED APPLICATIONS

The present application claims priority under 35 USC 119 to Japanese Patent Application No. 2008-039403 filed on Feb. 20, 2008 the entire contents of which are hereby incorporated by reference.

FIELD OF THE INVENTION

The present invention relates to an oil passage forming member having an oil passage formed for conducting oil to a supplied part supplied with the oil, and a hydraulic oil sensor mounted for detecting the hydraulic pressure in the oil passage. The oil passage forming member is provided, for example, in a power unit including an internal combustion engine.

DESCRIPTION OF BACKGROUND ART

In a power unit in which an internal combustion engine and a transmission are united with each other, a multiplicity of oil passages are formed to conduct oil to supplied parts supplied with the oil, such as lubricated parts, e.g., sliding parts in the power unit, and a hydraulic operating device using the oil as a working fluid. In the case where a component member of the power unit is used as an oil passage forming member and a bent oil passage is formed in the oil passage forming member, usually, a first hole and a second hole respectively constituting parts of the oil passage are made to intersect, thereby forming a bent passage part. In this instance, one of the first hole and the second hole is formed by drilling from an outer surface of the oil passage forming member, and, after the drilling, the aperture end part of one of the first and second holes which opens at the outer surface is closed with a plug. See, for example, Japanese Patent Laid-open No. Hei 6-117327.

In addition, an oil passage forming member is known that is fitted with a hydraulic pressure sensor for detecting the hydraulic pressure in the oil passage formed in the oil passage forming member.

Further, a system is known wherein the transmission of the power unit provided with the oil passage forming member is composed of a swash plate type hydrostatic continuously variable transmission. See, for example, Japanese Patent Laid-open No. 2005-248838 and Japanese Patent Laid-open No. 2005-263143.

Meanwhile, the hydraulic pressure sensor for detecting the supplying condition or hydraulic pressure condition of the oil supplied to the supplied part is desirably disposed as close as possible to the supplied part, in order to monitor more accurately the hydraulic pressure condition at the supplied part.

However, since the hydraulic pressure sensor must front on the oil passage, it may be necessary, for enabling the hydraulic pressure sensor to detect the hydraulic pressure at a preferable position in the oil passage, that a mounting hole which communicates with the oil passage and in which to fit the hydraulic pressure sensor be formed in the oil passage forming member. However, the formation of such a mounting hole needs special machining and, accordingly, leads to an increase in the cost of the oil passage forming member.

In addition, the plug used to close the aperture end part of the oil passage would itself increase the number of component parts, and needs a plug mounting step, thereby also causing an increase in cost.

SUMMARY AND OBJECTS OF THE INVENTION

According to an embodiment of the present invention, the accuracy in the detection of the hydraulic pressure condition at a supplied part is enhanced, while contriving a reduction in the cost of an oil passage forming member having an oil passage for conducting oil to the supplied part and being fitted with a hydraulic pressure sensor for detecting the hydraulic pressure in the oil passage.

According to an embodiment of the present invention, the accuracy and response in detection of the hydraulic pressure condition in a hydraulic operating device is enhanced together with the accuracy of monitoring the operating condition of the hydraulic operating device.

According to an embodiment of the present invention, the response of detection of the hydraulic pressure condition at the supplied part is enhanced.

According to an embodiment of the present invention, an oil passage forming member (16) includes a bent oil passage (82) formed for conducting oil to a supplied part (70), and a hydraulic pressure sensor (88) mounted for detecting a hydraulic pressure in the oil passage (82), wherein the oil passage (82) includes a first hole (85), and a second hole (86) intersecting the first hole (85) to constitute a bent passage part (82d); one (86) of the first hole (85) and the second hole (86) has an aperture end part (86a), and the aperture end part (86a) is closed with the hydraulic pressure sensor (88); and the bent passage part (82d) is a bent passage part located in the oil passage (82) at a position nearest to the supplied part (70).

According to an embodiment of the present invention, the oil passage (82) is a passage through which oil as a working fluid is supplied and discharged to and from a hydraulic operating device (70) which is the supplied part (70); the first hole (85) constitutes a terminal passage (82e), nearest to the hydraulic operating device (70), of the oil passage (82); and the second hole (86) is the one of the first hole (85) and the second hole (86), the one (86) being rectilinear in shape.

According to an embodiment of the present invention, the hydraulic pressure sensor (88) is disposed in the bent passage part (82d).

According to an embodiment of the present invention, in the first and second holes formed in the oil passage forming member so as to constitute a bent oil passage, the aperture end part of one of the first and second holes intersecting each other to constitute the bent passage part is closed by use of the hydraulic pressure sensor for detecting the hydraulic pressure in the oil passage. As a result, there is no need for a plug for exclusive use for closing the aperture end part of the one hole, so that the cost of the oil passage forming member fitted with the hydraulic pressure sensor is reduced.

In addition, since the hydraulic pressure sensor is mounted by utilizing the one hole constituting the oil passage for conducting the oil to the supplied part, it is needless to form the hole for exclusive use for mounting the hydraulic oil sensor, so that the cost of the oil passage member is reduced. Moreover, since the portion at which the hydraulic pressure sensor detects the hydraulic pressure is located in the bent passage part of the oil passage formed in the oil passage forming member which is the nearest to the supplied part, it is possible to detect the hydraulic pressure at a position near the supplied part, whereby accuracy in detection of the hydraulic pressure condition at the supplied part can be enhanced.

According to an embodiment of the present invention, the hydraulic pressure sensor is fitted in the second hole which is rectilinear in shape, so that the hydraulic pressure sensor is located in the oil passage at a position on the extension of the passage composed of the second passage. Therefore, when the hydraulic operating device is supplied with the working fluid at a high hydraulic pressure, the hydraulic pressure of the working fluid at high hydraulic pressure which flows from the second hole and through the first hole to reach the hydraulic operating device can be detected speedily. On the other hand, when the working fluid is discharged from the hydraulic operating device, the hydraulic pressure sensor is less liable to be influenced by the dynamic pressure of the working fluid flowing from the first hole toward the second hole, so that the accuracy in detection of the hydraulic pressure at the time when the working fluid is discharged from the hydraulic operating device is enhanced. In addition, the hydraulic pressure sensor detects the hydraulic pressure in the bent passage part where the first and second holes intersect, and the first hole constitutes that terminal passage of the oil passage which is the nearest to the hydraulic operating device. Therefore, variations in the hydraulic pressure in the hydraulic operating device due to the supply and discharge of the working fluid can be detected speedily, so that it is possible to enhance the response in the detection of the hydraulic pressure condition in the hydraulic operating device by the hydraulic pressure sensor for detecting the hydraulic pressure in the bent passage part.

As a result, the accuracy and response in detection of the hydraulic pressure condition in the hydraulic operating device are enhanced, and the accuracy of monitoring the operating condition of the hydraulic operating device is enhanced.

According to an embodiment of the present invention, the hydraulic pressure sensor is disposed in the bent passage part where the first and second holes intersect, and, therefore, the hydraulic pressure in the bent passage part can be immediately detected in the bent passage part. Consequently, variations in the hydraulic pressure at the supplied part can be detected swiftly, and the response in detection of the hydraulic pressure condition at the supplied part is enhanced.

In addition, in the case where the supplied part is the hydraulic operating device, variations in the hydraulic pressure of the working fluid supplied and discharged into and from the hydraulic operating device can be detected speedily, so that the response in detection of the hydraulic pressure condition in the hydraulic operating device is enhanced. Accordingly, the accuracy of monitoring the operating condition of the hydraulic operating device is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, an embodiment of the present invention will be described below, referring to FIGS. 1 to 4.

Figure 1:
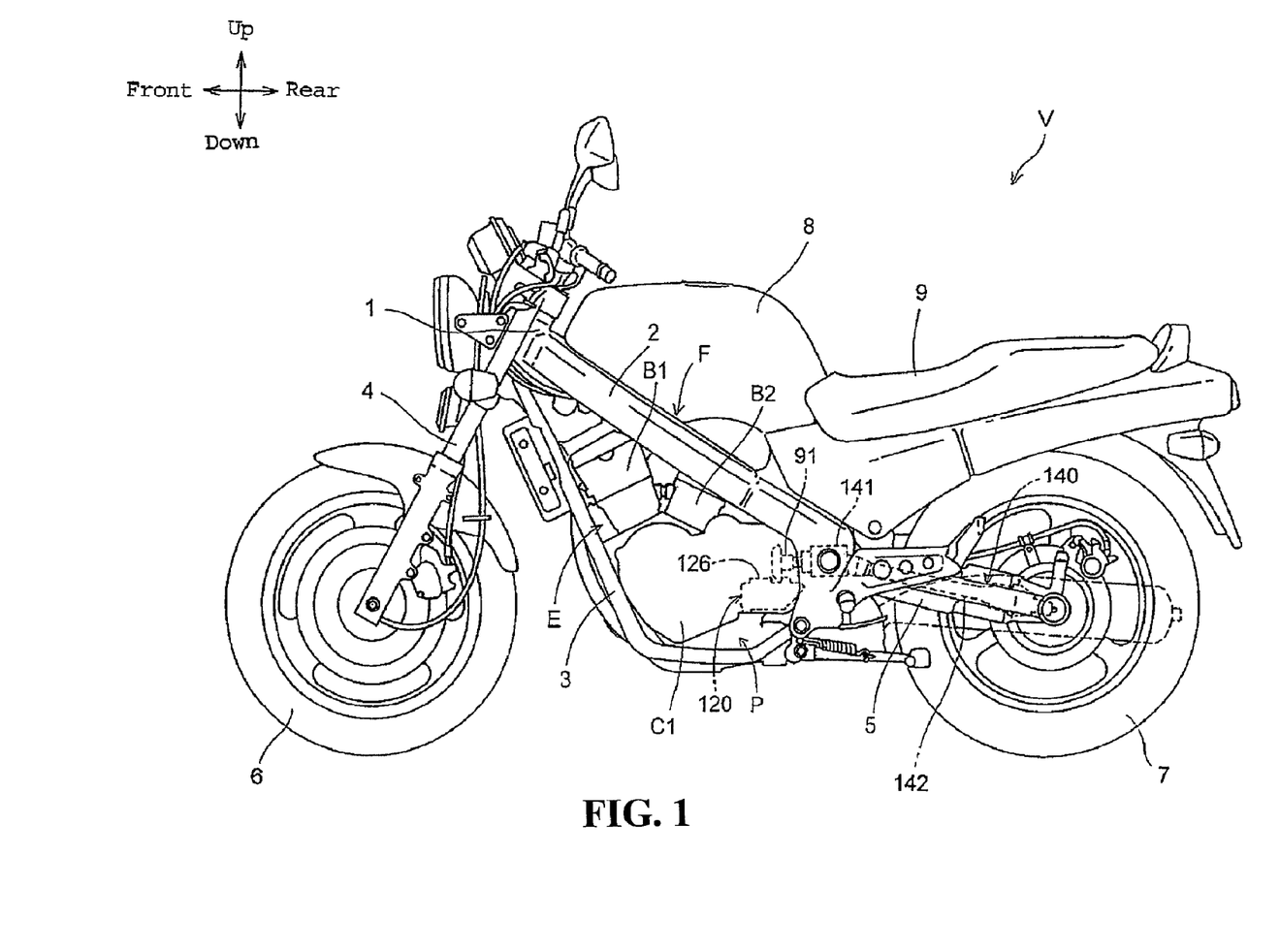
FIG. 1 is an essential part left side view of a motorcycle fitted with the sound insulation structure to which the present invention is applied.

Referring to FIG. 1, in this embodiment, an oil passage forming member to which the present invention is applied is provided in a power unit P, and the power unit P is provided in a motorcycle V serving as a vehicle.

In addition, in this embodiment, the left-right direction and the front-rear direction coincide with the left-right direction and the front-rear direction with respect to the motorcycle V on which the power unit P is mounted, and the up-down direction is the vertical direction.

The axial direction, which term will be used in relation to each rotary shaft to be described later, means the direction of the axis of rotation of the shaft. The axial direction of a crankshaft 33 (see FIG. 3) provided in an internal combustion engine E coincides with the left-right direction in this embodiment. In addition, when either one of the rightward sense and the leftward sense is assumed to be one sense of the axial direction of the crankshaft 33, the other of the rightward sense and the leftward sense is the other sense of the axial direction of the crankshaft 33.

The motorcycle V includes a body frame F having a head pipe 1, a main frame 2 and a down tube 3; a power unit P supported on the body frame F; a front wheel 6 rotatably supported on a front fork 4 steerably supported on the head pipe 1; a rear wheel 7 rotatably supported on a swing arm 5 swingably supported on the main frame 2; and a fuel tank 8 and a riders' seat 9 which are supported on the body frame F. The power unit P is disposed below the riders' seat 9 in the motorcycle V.

Figure 2:
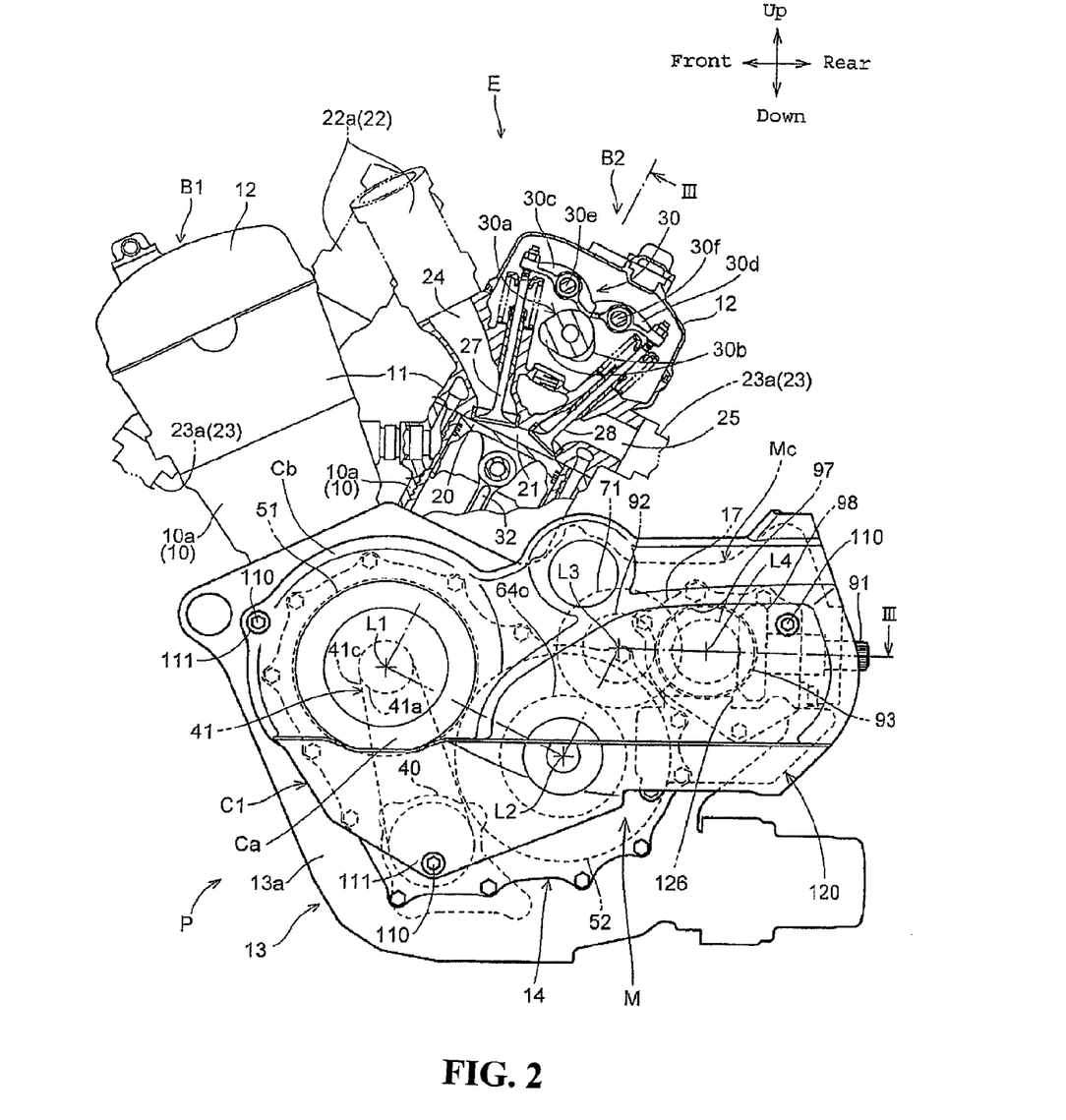
FIG. 2 is an essential part side view of a power unit provided in the motorcycle shown in FIG. 1.
Figure 3:
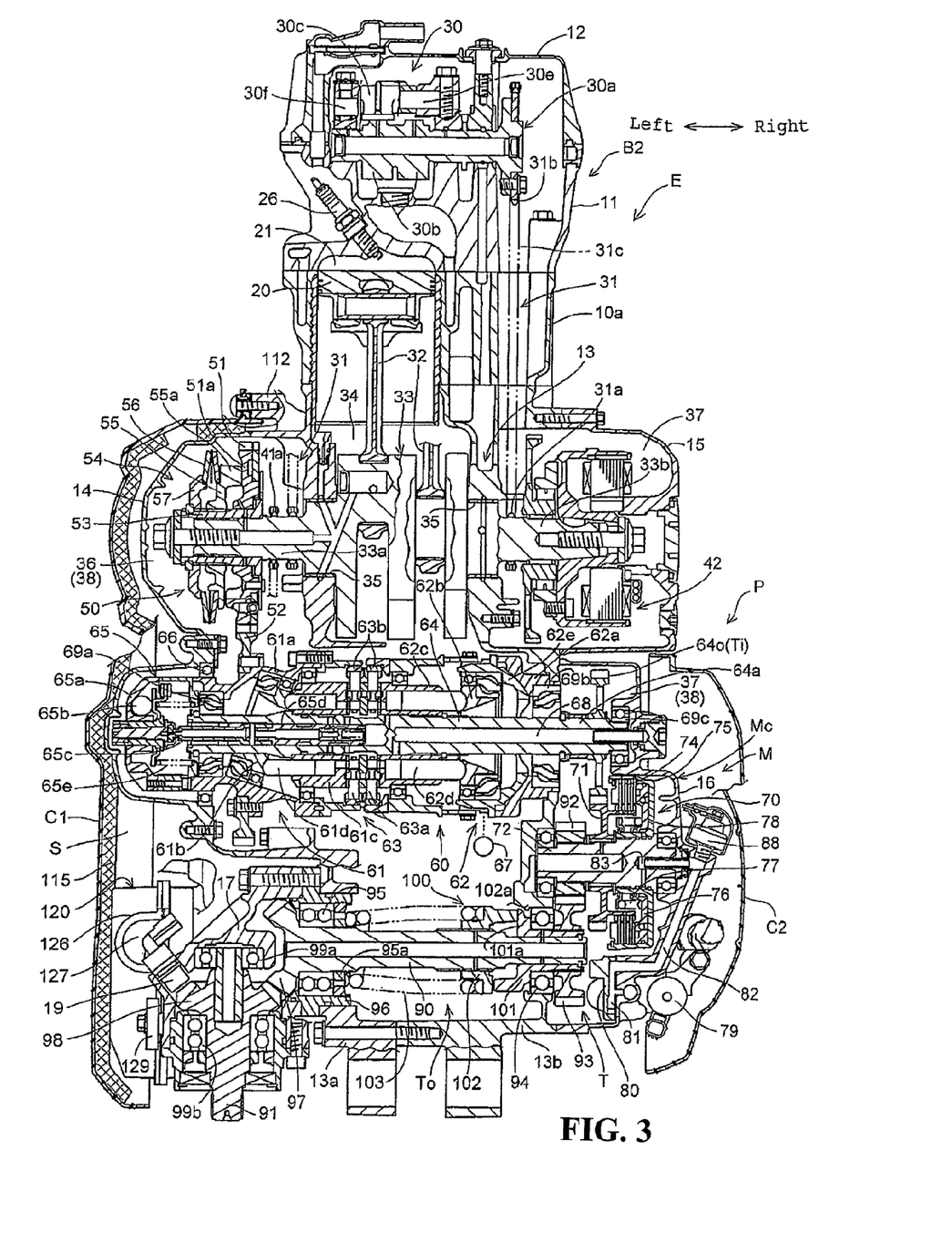
FIG. 3 is a sectional view taken along line III-III of FIG. 2.

Referring to FIGS. 2 and 3, the power unit P includes an internal combustion engine E which is a water-cooled type multi-cylinder 4-stroke internal combustion engine, and a transmission unit M having a transmission 60 (see FIG. 3) to which motive power from the internal combustion engine E is inputted. The internal combustion engine E and the transmission unit M constitute a united apparatus, which outputs motive power for driving the rear wheel 7.

The internal combustion engine E, supported on the body frame F in a transverse layout with the crankshaft 33 oriented in the vehicle width direction, is a V-type internal combustion engine having a front bank B1 and a rear bank B2. The transmission 60 is a hydrostatic type continuously variable transmission having a hydraulic pump 61 and a hydraulic motor 62.

The motive power generated by the internal combustion engine E is inputted to the transmission unit M, and is then transmitted from a power take-off shaft 91 of the transmission unit M to the rear wheel 7, serving as a drive wheel, through a final transmission mechanism 140 having a drive shaft 142 which is connected to the power take-off shaft 91 through a universal joint 141 that is contained in the swing arm 5.

The internal combustion engine E has an engine main body composed of a cylinder block 10 having a plurality of (in this embodiment, two) cylinders 10a arranged so as to constitute a V-shaped pair of banks B1 and B2; a pair of cylinder heads 11 connected to upper end parts of the cylinders 10a in the banks B1 and B2, respectively; a pair of cylinder head covers 12 connected to upper end parts of the cylinder heads 11, respectively; and a crankcase 13 connected to a lower end part of the cylinder block 10.

In addition, both the banks B1 and B2 are basically the same in the structure pertaining to the cylinder 10a, the cylinder head 11 and the cylinder head cover 12. In the following, therefore, description will be made referring mainly to the structure of the rear bank B2.

Referring to FIGS. 2 and 3, the cylinder head 11 is provided with a combustion chamber 21 opposed to a piston 20 in the cylinder axial direction; an intake port 24 through which a gaseous mixture of intake air fed from an intake system 22 having a throttle body 22a connected to the cylinder head 11 and a fuel from a fuel injection valve (not shown) is introduced into the combustion chamber 21; an exhaust port 25 through which an exhaust gas from the combustion chamber 21 is introduced into an exhaust system 23 having an exhaust pipe 23a connected to the cylinder head 11; a spark plug 26 fronting on the combustion chamber 21; and an intake vale 27 and an exhaust valve 28 for opening and closing the intake port 24 and the exhaust port 25, respectively.

A valve system 30 for opening and closing the intake valve 27 and the exhaust valve 28 includes a camshaft 30a having a valve cam 30b, and rocker arms 30c, 30d making contact with the intake valve 27 and the exhaust valve 28 and driven by the valve cam 30b to rock. The valve cam 30b opens and closes the intake valve 27 and the exhaust valve 28 through the rocker arms 30c, 30d rockably supported on rocker shafts 30e, 30f, respectively.

A valve-operating power transmission mechanism 31 for driving the camshaft 30a to rotate by a torque of the crankshaft 33 includes a drive sprocket 31a provided at both end parts 33a, 33b of the crankshaft 33, a cam sprocket 31b provided on the camshaft 30a, and a chain 31c wrapped around both the sprockets 31a, 31b.

The crankcase 13 is a left-right split crankcase having a configuration in which a pair of case halves 13a, 13b as case parts split into a plurality in the vehicle width direction (left-right direction) are coupled. The crankshaft 33 connected to pistons 20 through connecting rods 32 is contained in a crank chamber 34 formed by the crankcase 13, and is rotatably supported on both the case halves 13a, 13b through a pair of main bearings 35. A part of the crankcase 13 constitutes a transmission case Mc of the transmission unit M.

In addition, the internal combustion engine E has a pair of covers 14, 15 connected respectively to the left and right case halves 13a, 13b through a multiplicity of bolts.

Of the crankshaft 33, a shaft end part 33a on one side which projects to the left from the inside of the crank chamber 34 extends into a power transmission chamber 36 formed as a left chamber by the left case half 13a and the left cover 14, and a shaft end part 33b on the other side which projects to the right from the inside of the crank chamber 34 extends into an accessory chamber 37 formed as a right chamber by the right case half 13b and the right cover 15. An input-side transmission mechanism 50 of the transmission unit M and a drive sprocket 41a around which to wrap a chain 41c of a power transmission mechanism 41 for driving an oil pump 40 are provided at the shaft end part 33a; on the other hand, an AC generator 42 is provided at the shaft end part 33b. The transmission unit M, the oil pump 40 and the AC generator 42 are all driven units which are driven by the torque of the crankshaft 33.

The transmission unit M includes the transmission 60 driven to rotate by the torque of the crankshaft 33, the input-side transmission mechanism 50 for inputting the torque of the crankshaft 33 to the transmission 60, an output-side transmission mechanism T to which the torque outputted from the transmission 60 is inputted, and the transmission case Mc forming a transmission chamber 38 in which the transmission 60 and both the transmission mechanisms 50, T are contained.

The torque (or motive power) generated by the internal combustion engine E is transmitted from the crankshaft 33 serving as an engine output shaft to the rear wheel 7 (see FIG. 1) through a torque transmission path composed of the input-side power transmission mechanism 50, the transmission 60, the output-side power transmission mechanism T and the final transmission mechanism 140 (see FIG. 1) (hereinafter referred to as "torque transmission path"). The torque transmission path includes, with the transmission 60 as a boundary, an input-side transmission path between the crankshaft 33 and the transmission 60, the transmission 60 itself, and an output-side torque transmission path between the transmission 60 and the rear wheel 7. Therefore, the input-side torque transmission path is composed of the input-side transmission mechanism 50, whereas the output-side torque transmission path is composed of the output-side transmission mechanism T and the final transmission mechanism 140 to which the torque from the output-side transmission mechanism T is inputted.

The transmission case Mc includes the pair of case halves 13a, 13b, the left cover 14 serving also as a left transmission cover, the right cover 16 which is a right transmission cover connected to the right case half 13b, and a gear cover 17 which is a cover connected to a rear part of the left case half 13a together with a bearing housing 96. Of the first and second power transmission chambers 36, 37 constituting the transmission chamber 38, the first power transmission chamber 36 in which the transmission 60, the input-side transmission mechanism 50 and most part of the output-side transmission mechanism T exclusive of a part such as a running clutch 70 are disposed is defined by both the case halves 13a, 13b and the left cover 14, whereas the second transmission chamber 37 serving as a clutch chamber in which to dispose the running clutch 70 is defined by the right case half 13b and the right cover 16.

The crankcase 13, the left cover 14, both the right covers 15, 16 and the gear cover 17 constitute a power case of the power unit P.

The input-side transmission mechanism 50 includes a gear mechanism 51, 52 for transmitting the torque of the crankshaft 33 to the transmission 60, and an input-side torque damper 54 for absorbing excess torque generated in the input-side torque transmission path.

The gear mechanism 51, 52 includes a drive gear 51 connected to the crankshaft 33 through a transmission mechanism, which is composed of a collar 53 spline fitted over the shaft end part 33a and an input cam member 55 spline fitted over the collar 53, and a driven gear 52 integrally rotatably provided on the pump housing 61a serving as an input rotary body in the transmission 60. The drive gear 51 is rotatably supported on the collar 53, and is provided at the shaft end part 33a through the collar 53.

The torque damper 54 of a cam type includes an input cam member 55 as an input member movable in the axial direction relatively to the shaft end part 33a; the drive gear 51 being an output cam member as an output member which is engaged with the input cam member 55 and to which the torque of the crankshaft 33 is inputted through the input cam member 55; and a damper spring 56 as an urging member for urging the input cam member 55 in the axial direction so as to bring the input cam member 55 into contact with the drive gear 51. The damper spring 56, composed of a plurality of disc springs, is disposed between a spring retainer 57 held by the collar 53 and the input cam member 55. The input cam member 55 has an input cam part 55a, whereas the drive gear 51 has an output cam part 51a. The input cam part 55a and the output cam part 51a make contact with each other in the axial direction and in the circumferential direction under the urging force of the damper spring 56, and are relatively slidable in the circumferential direction.

The torque damper 54 rotates the input cam member 55 and the drive gear 51 as one body when a torque of not more than a preset first set torque acts between the input cam member 55 and the drive gear 51. When an excess torque of more than the first set torque acts at the time of deceleration of the motorcycle V (see FIG. 1) or the internal combustion engine E or in similar situations, for example, at the time of engine brake of the motorcycle V, sliding in the circumferential direction occurs between the input cam member 55 and the drive gear 51, so that the input cam member 55 and the drive gear 51 are rotated relative to each other while the input cam member 55 driven by the output cam part 51a is being moved in the axial direction against the urging force of the damper spring 56, whereby the excess torque is absorbed.

The transmission 60 is similar to the transmissions disclosed in Japanese Patent Laid-open No. 2005-248838 and Japanese Patent Laid-open No. 2005-263143, and includes a swash plate type hydraulic pump 61, a swash plate type hydraulic motor 62, a valve mechanism 63 for controlling the flow of a working fluid between the hydraulic pump 61 and the hydraulic motor 62, a transmission output shaft 64 as an output rotary body, and an input-side clutch 65 which is a starting clutch for switching between stoppage and rotation of the transmission output shaft 64.

The hydraulic pump 61 includes a pump housing 61a rotatably supported on the left cover 14 through a bearing 66, a pump swash plate 61b contained in the pump housing 61a, a pump body 61c disposed opposite to the pump swash plate 61b in the axial direction, and a plurality of pump plungers 61d reciprocatably fitted in the pump body 61c and driven by the pump swash plate 61b to perform suction and discharge of the working fluid.

The hydraulic motor 62 includes a motor housing 62a fixed to the right case half 13b, a support member 62e swingably supported on a spherical supporting surface formed as part of the motor housing 62a, a motor swash plate 62b rotatably supported on the support member 62e, a motor body 62c disposed opposite to the motor swash plate 62b in the axial direction, a plurality of motor plungers 62d reciprocatably fitted in the motor body 62c and driven by the working fluid discharged from the hydraulic pump 61, and an electric motor 67 as an actuator for driving the support member 62e. With the support member 62e driven by the electric motor 67 to swing, the inclination angle of the motor swash plate 62b is changed, whereby the rotating speed of the transmission output shaft 64 in relation to the rotating speed of the crankshaft 33 is changed, and the rotating speed of the crankshaft 33 is changed.

The valve mechanism 63 provided between the hydraulic pump 61 and the hydraulic motor 62 in the axial direction includes a plurality of spools 63a for controlling the flow of the working fluid as an oil discharged from the oil pump 40 and supplied from an oil passage formed in the right cover 16 through an oil passage 68 formed in the transmission output shaft 64, and control rings 63b for controlling the positions of the spools 63a according to the rotating position of the pump housing 61a.

The transmission output shaft 64 spline fitted in the motor body 62c is rotatably supported on the pump housing 61a, the motor housing 62a and the right cover 16 through bearings 69a, 69b, 69c, respectively, and has a rotational center line L2 parallel to the rotational center line L1 of the crankshaft. In addition, rotational center lines L3 and L4 of an output shaft 72 and an intermediate shaft 90 which will be described later are parallel to both the rotational center lines L1, L2.

The clutch 65 disposed at an end part nearer to the left cover 14 in the axial direction in the transmission 60 makes and brakes the transmission of a torque from the driven gear 52 to the transmission output shaft 64. The clutch 65 includes an input member 65a rotated as one body with the pump housing 61a, a centrifugal weight which is supported by the input member 65a and which can be moved in the radial direction while being guided by the input member 65a under a centrifugal force generated according to the rotating speed of the input member 65a, an output member 65c which can be moved in the axial direction according to the position of the centrifugal weight 65b and which is rotated as one body with the input member 65a, and a clutch spring 65e which is disposed between the input member 65a and the output member 65c and which presses the centrifugal weight 65b against the input member 65a through the output member 65c.

The output member 65c has a spool 65d which constitutes a spool valve with the transmission output shaft 64 as a sleeve.

When the engine rotating speed of the internal combustion engine E is not more than an idling speed, the clutch 65 is in a torque interruption position shown in FIG. 3. In this instance, the working fluid discharged from the hydraulic pump 61 returns to the hydraulic pump 61 without rotating the hydraulic motor 62. In addition, when the engine rotating speed exceeds the idling speed, the spool 65 is moved to the right while being driven by the centrifugal weight 65b moved radially outwards under a centrifugal force, and the clutch 65 takes a torque transmission position. With the clutch 65 in this torque transmission position, the working fluid discharged from the hydraulic pump 61 flows into the hydraulic motor 62, the hydraulic motor 62 is thereby driven to rotate, and the torque of the crankshaft 33 is transmitted to the transmission output shaft 64. In an engine rotating speed region in excess of the idling speed, the transmission output shaft 64 is rotated at a rotating speed changed according to the inclination angle of the motor swash plate 62b.

The output-side transmission mechanism T includes an input mechanism Ti composed of an output gear 64o provided on the transmission output shaft 64 and rotated as one body with the transmission output shaft 64, the running clutch 70 as an output-side clutch for switching between a drive position and a neutral position by making and breaking the transmission of the torque from the transmission 60 to the rear wheel 7, and an output mechanism To as a transmission mechanism for transmitting to the final transmission mechanism 140 (see FIG. 1) the torque transmitted from the transmission 60 through the running clutch 70.

The output gear 64o as the output rotary body is spline fitted over the shaft end part 64a, projecting to the right from the bearing 69b to extends into the second power transmission chamber 37, of the transmission output shaft 64, and is meshed with an input gear 71 of the running clutch 70.

Figure 4:
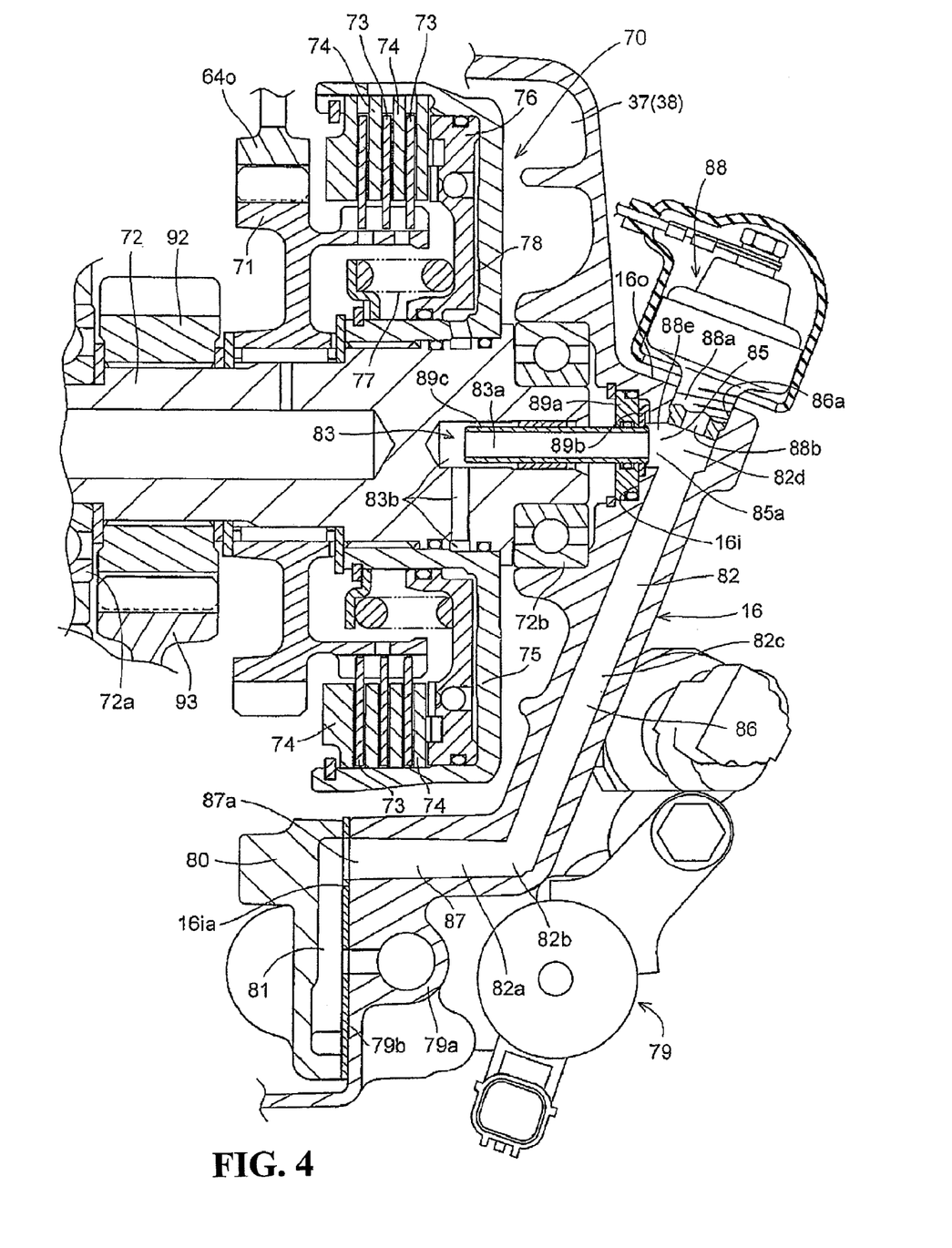
FIG. 4 is an enlarged view of the vicinity of the running clutch of the power unit shown in FIG. 3.

Referring to FIGS. 3 and 4, the running clutch 70 which is a hydraulic type multiple-disk frictional clutch includes an output shaft 72 as an output member which is rotatably borne on the right case half 13b and the right cover 16 through bearings 72a, 72b; an input gear 71 as an input member which is rotatably supported on the output shaft 72 and to which a torque from the transmission output shaft 64 serving as an input shaft is inputted through the output gear 64o; a plurality of first clutch disks 73 rotated integrally with the input gear 71; a plurality of second clutch disks 74 stacked alternately with the first clutch disks 73; a housing 75 as an intermediate member which is rotated integrally with the second clutch disks 74 and which is spline fitted over the output shaft 72 so as to be rotated as one body with the latter; a pushing piston 76 as a pushing member which is reciprocatably fitted in the housing 75 capable of transmitting to the output shaft 72 the torque from the input gear 71 transmitted through the first and second clutches 73, 74 in their connected state and which is capable of pushing the first and second clutch disks 73, 74 to bring the latter into mutual contact; and a clutch spring 77 for urging the pushing piston 76 so as to separate the first and second clutch disks 73, 74 from each other.

The running clutch 70 as a hydraulic operating unit capable of being operating by a hydraulic pressure is provided with a hydraulic pressure chamber 78 into which the working fluid for driving the pushing piston 76 is conducted, by the housing 75 and the pushing piston 76. The working fluid here is a portion of the oil discharged from the oil pump 40 (see FIG. 2) driven by a power transmission mechanism 41.

The hydraulic pressure in the hydraulic pressure chamber 78 is controlled by a hydraulic pressure controller for controlling the supply and discharge of the oil into and from the hydraulic pressure chamber 78. The hydraulic pressure controller is composed of a hydraulic pressure control valve 79 provided at the right cover 16 and controlled by a controller according to an operation of a speed change position operating member, and an oil circuit through which the oil controlled by the hydraulic pressure control valve 79 flows.

The oil circuit provided as a passage for supplying the oil into the hydraulic pressure chamber 78 and discharging the oil from the hydraulic pressure chamber 78 is composed of an oil passage 81 formed in a connection member 80 connected through a seal plate 79b to the hydraulic pressure control valve 79 having a part of the right cover 16 as a valve body 79a, an oil passage 82 connected to the oil passage 81 and formed in the right cover 16, and an oil passage 83 for communication between the oil passage 82 and the hydraulic pressure chamber 78.

The oil passage 82 formed in the right cover 16 that serves as an oil passage forming member which is a single member and which is a stationary member in the transmission unit M is an oil passage having one or more bent passage parts, here, two bent passage parts 82b, 82d. The oil passage 82 is composed of a first hole 85 extending rectilinearly in parallel to the axial direction, a third hole 87 extending rectilinearly in parallel to the first hole 85, and a second hole 86 extending rectilinearly so as to intersect the first hole 85 and the third hole 87. The first to third holes 85 to 87 are formed by drilling adopted as machining.

The first hole 85 is formed by machining from the inner surface 16i of the right cover 16, the second hole 86 is formed by machining from the outer surface 16o of the right cover 16, and the third hole 87 is formed by machining from a mating surface 16ia which is a part of the inner surface 16i and which is mated to a connection member 90. Therefore, the first to third holes 85 to 87 respectively have aperture end parts 85a to 87a for forming starting end parts of the drilling. The aperture end parts 85a to 87a are opened in the inner surface 16i or the outer surface 16o constituting the surface of the right cover 16.

In addition, the first hole 85 is extremely smaller than the second and third holes 86, 87 in hole length, and a passage part 82e configured in the first hole 85 has a passage length of not more than the diameter of the first hole 85 (namely, the diameter of the circular cross-sectional shape).

The oil passage 82 is formed to be composed of the first hole 85, the second hole 86 and the third hole 87, with the aperture end part 86a of the second hole 86 being closed with a hydraulic pressure sensor 88 functioning also as a plug. In the oil passage 82, the first hole 85 constitutes the rectilinear passage part 82e as a terminal passage nearest to the hydraulic pressure chamber 78, the third hole 87 constitutes a rectilinear passage part 82a as a starting end passage nearest to the hydraulic pressure control valve 79, and the second hole 86 constitutes a rectilinear passage part 82c as an intermediate passage for communication between the first and third holes 85 and 87, wherein the part where the first hole 85 and the second hole 86 intersect constitutes the first bent passage part 82d, and the part where the second hole 86 and the third hole 87 intersect constitutes the second bent passage part 82b. Therefore, the bent passage part 82d is a bent passage part provided in the oil passage 82 at a position nearest to the hydraulic pressure chamber 78.

In addition, in order to detect the hydraulic pressure condition at the running clutch 70 and thereby to monitor the operating condition of the running clutch 70, a hydraulic pressure sensor 88 for detecting the hydraulic pressure in the oil circuit is attached to the right cover 16. The hydraulic pressure sensor 88 is disposed to front on the bent passage part 82d, and detects the hydraulic pressure in the bent passage part 82d of the oil passage 82.

More specifically, the hydraulic pressure sensor 88 has an insertion part 88a inserted by screwing into the aperture end part 86a, and the insertion part 88a is provided with a detection hole 88b as a detecting part fronting on the bent passage part 82d. The hydraulic pressure sensor 88 detects the hydraulic pressure of the oil flowing in through the detection hole 88b. The detection hole 88b is formed to be parallel to and concentric with the second hole 86, and is opened into the bent passage part 82d. Therefore, the aperture end part 86a of the second hole 86 is closed in an oil-tight manner with the hydraulic pressure sensor 88. Accordingly, the second hole 86 is one of the first hole 85 and the second hole 86 which intersect to thereby constitute the bent passage part 82d.

When the oil at a high hydraulic pressure controlled by the hydraulic pressure control valve 79 is supplied into the hydraulic pressure chamber 78, the oil flowing from the passage part 82c (or the second hole 86) toward the passage part 82e (or the first hole 85) is liable to flow into the detection hole 88b, making it easier to detect the hydraulic pressure, so that the detection of the hydraulic pressure is speedily performed. On the other hand, when the oil in the hydraulic pressure chamber 78 is discharged under the control of the hydraulic pressure control valve 79, the oil flowing from the passage part 82e (or the first hole 85) toward the passage part 82c (or the second hole 86) is not liable to flow into the detection hole 88b, so that the hydraulic pressure sensor 88 is hardly influenced by the dynamic pressure of the oil flowing from the passage part 82e toward the passage 82c.

The oil passage 83 is composed of an oil passage 83a opening into the passage part 82e, and an oil passage 83b which communicates with the passage part 82e through the oil passage 83a and which opens into the hydraulic pressure chamber 78. The oil passage 83a is formed by a conduit 89c which is a member separate from the right cover 16 and which is attached to the right cover 16 by a holding member 89a and a detent 89b. In addition, the oil passage 83b is composed of a hole or groove formed by the output shaft 72 serving as a movable member. The housing 75 is rotated as one body with the output shaft 72.

In the running clutch 70 as above, when the hydraulic pressure chamber 78 is supplied with a high-pressure oil and a high hydraulic pressure is established in the hydraulic pressure chamber 78, the pushing piston 76 presses the first and second clutch disks 73, 74 against the springy force of the clutch spring 77, resulting in a connected condition in which the input gear 71 and the housing 75 are rotated as one body under the function of friction between both the first and second clutch disks 73, 74, and the torque of the transmission output shaft 64 is transmitted through both the gears 64o and 71 to the output shaft 72. On the other hand, when the working fluid is discharged from the hydraulic pressure chamber 78 and a low hydraulic pressure is established in the hydraulic pressure chamber 78, both the first and second clutch disks 73, 74 are separated from each other by the springy force of the clutch spring 77, resulting in a disconnected condition in which the transmission of torque between the input gear 71 and the housing 75 is interrupted, and the transmission of the torque of the transmission output shaft 64 to the output shaft 72 is interrupted. In this manner, the supply and discharge of the oil into and from the hydraulic pressure chamber 78 through the oil passages 81, 82 and 83 are controlled, whereby the connection and disconnection of the running clutch 70 are controlled.

Referring to FIG. 3, the above-mentioned output mechanism To includes an intermediate shaft 90 being a first power take-off shaft as a driven rotary shaft driven to rotate by the output shaft 72 serving as a driving rotary shaft; a second power take-off shaft 91 as a driven rotary shaft driven to rotate by the intermediate shaft 90 and operative to drive a drive shaft 142 (see FIG. 1) to rotate; a first transmission mechanism which is disposed between the output shaft 72 and the intermediate shaft 90 in the output-side torque transmission path and by which the torque of the output shaft 72 is inputted to the intermediate shaft 90; a second transmission mechanism which is disposed between the intermediate shaft 90 and the power take-off shaft 91 in the output-side torque transmission path and by which the torque of the intermediate shaft 90 is inputted to the power take-off shaft 91; and an output-side torque damper 100 which is disposed between the transmission 60 and the power take-off shaft 91 in the output-side torque transmission path and which absorbs an excess torque generated in the output-side torque transmission path.

The first transmission mechanism is composed of a drive gear 92 as a driving rotary body rotated as one body with the output shaft 72, and a driven gear 93 as an input rotary body which is meshed with the drive gear 92 and by which the torque of the output shaft 72 is inputted to the intermediate shaft 90. The driven gear 93 is provided so as to be spline fitted on an input cam member 101 of the torque damper 100 and to be rotated as one body with the input cam member 101, and is connected to the intermediate shaft 90 through the torque damper 100.

The intermediate shaft 90, at its shaft part on the right side, is rotatably supported on the right case half 13b through the input cam member 101 and a bearing 94. The intermediate shaft 90, at its shaft part on the left side, is supported on the left case half 13a through a bearing 95 and a bearing housing 96 connected to the left case half 13a.

Of the intermediate shaft 90, a shaft end part protruding to the right from the bearing 94 is accompanied by a driven gear 93 through the input cam member 101, and a shaft end part protruding to the left from the bearing 94 is integrally provided with a drive gear 97.

The torque damper 100 of a cam type includes the input cam member 101 as an input member which is rotatably supported on the intermediate shaft 90 and by which the torque of the output shaft 72 is inputted; an output cam member 102 as an output member which is engaged with the input cam member 101 and by which the torque from the input cam member 101 is transmitted to the intermediate shaft 90; and a damper spring 103 as an urging member for urging the output cam member 102 in the axial direction to bring the latter into contact with the input cam member 101. The damper spring 103 composed of a coil spring is disposed between a spring retainer 95a, which serves also as a stationary member of the bearing 95, and the output cam member 102.

The input cam member 101 is rotatably supported on the intermediate shaft 90, so that the driven gear 93 is also rotatably supported on the intermediate shaft 90.

The input cam part 101a possessed by the input cam member 101 and the output cam part 102a possessed by the output cam member 102 are brought into mutual contact in the axial direction and in the circumferential direction by the urging force of the damper spring 103, and are relatively slidable in the circumferential direction. The torque damper 100 rotates the input cam member 101 and the output cam member 102 as one body when a torque of not more than the above-mentioned second set torque acts between both the cam members 101, 102. When an excess torque of more than the second set torque acts at the time of deceleration of the motorcycle V (see FIG. 1) or the internal combustion engine E or in similar situations, for example, at the time of engine brake of the motorcycle V, sliding in the rotating direction occurs between the input cam member 101 and the output cam member 102, so that the input cam member 101 and the output cam member 102 are rotated relative to each other while the output cam member 102 is being driven by the input cam member 101 to move in the axial direction against the urging force of the damper spring 103, whereby the excess torque is absorbed.

The above-mentioned second transmission mechanism is composed of the drive gear 97 composed of a bevel gear, and a driven gear 98 composed of a bevel gear which is meshed with the drive gear 97 and which is formed as one body with the power take-off shaft 91.

The power take-off shaft 91 is disposed in the gear cover 17 connected to the left case half 13a, and is rotatably supported through a pair of bearings 99a, 99b. In addition, the gear cover 17 is provided with a rotating position sensor 19 for detecting the rotating position of the driven gear 98, and the vehicle velocity is detected based on a detection signal generated by the sensor 19.

Referring to FIGS. 2 and 3, most parts of the left case half 13a and the left cover 14 and the gear cover 17 (hereinafter the whole body of "the left case half 13a, the left cover 14 and the gear cover 17" will be referred to as "the side part cover," if necessary) constituting a side wall of the power unit P in the vehicle width direction (which is also the axial direction of the crankshaft 33) is covered with an armor cover C1 on the outside of the power unit P from the left side which is a predetermined direction. In addition, most parts of the right case half 13b and the right cover 16 constituting another side wall of the power unit P in the vehicle width direction is covered with an armor cover C2 from the right side which is the outside of the power unit P. Both the armor covers C1, C2 formed from a synthetic resin are sound insulation covers as cover members which enhance the appearance quality of the power unit P and reduce the radiant sound generated by the power unit P.

The armor cover C1 is fixed to mounting seats 112 provided in the left case half 13a, the left cover 14 and the gear cover 17 (in FIG. 3, the mounting seat 112 provided in the left case half 13a is shown) by bolts 110 at a plurality of, specifically three, mounting parts 111. The armor cover C1 covers substantially the whole body of the left cover 14, exclusive of a lower edge part of the left cover 14, and the whole body of the gear cover 17, from the left side.

A space S is formed between the side part cover and the armor cover C1 which are disposed so as to form a spacing in the left-right direction.

For reducing the radiant sound, the armor cover is provided with a sound absorbing material 115 which is composed of a foamed material (for example, polyurethane foam) and is disposed along an inner surface fronting on the space S.

In the space S, a resonator 120 capable of resonating at a specified frequency of the radiant sound is disposed between the sound absorbing material 115 and the side part cover. The resonator 120 communicates with the space S through an aperture part 127 formed by a neck part 126.

Now, the operation and effects of this embodiment configured as above will be described below.

In the right cover 16 which is provided with the bent oil passage 82 for conducting the oil to the hydraulic type running clutch 70 and which is fitted with the hydraulic pressure sensor 88, the oil passage 82 is composed of the first hole 85 and the second hole 86 intersecting the first hole 85 so as to constitute the bent passage part 82d, the second hole 86 which is one of the first hole 85 and the second hole 86 has the aperture end part 86a, the aperture end part 86a is closed with the hydraulic pressure sensor 88, and the bent passage part 82d is a bent passage part formed in the oil passage 82 at a position nearest to the hydraulic pressure chamber 78 of the running clutch 70, whereby the hydraulic pressure sensor 88 for detecting the hydraulic pressure in the oil passage 82 is used for closing the aperture end part 86a of the second hole 86, constituting the bent passage part 82d by intersecting the first hole 85, of the first and second holes 85 and 86 formed in the right cover 16 so as to constitute the bent oil passage 82. As a result, there is no need for a plug for exclusive use for closing the aperture end part 86a of the second hole 86, and the cost of the right cover 16 fitted with the hydraulic pressure sensor 88 is reduced.

In addition, since the hydraulic pressure sensor 88 is mounted by utilizing the second hole 86 constituting the oil passage 82 for conducting the oil to the running clutch 70 serving as a supplied part, there is no need to form a hole for exclusive use for mounting the hydraulic pressure sensor 88, so that the cost of the right cover 16 is reduced. Moreover, since the portion where to detect the hydraulic pressure by the hydraulic pressure sensor 88 is the bent passage part 82d which is the part nearest to the running clutch 70 supplied with the oil, of the oil passage 82 formed in the right cover 16, it is possible to detect the hydraulic pressure at a position near the running clutch 70, so that the accuracy in the detection of the hydraulic pressure condition in the running clutch 70 can be enhanced.

The oil passage 82 is a passage for supplying and discharging the oil as the working fluid to and from the running clutch 70 serving as a hydraulic operating device, the first hole 85 constitutes that terminal passage of the oil passage 82 which is the nearest to the running clutch 70, and the second hole 86 having the aperture end part 86a is rectilinear in shape, whereby the hydraulic pressure sensor 88 is mounted in the rectilinear second hole 86. Thus, it is located on the extension of the passage part 82c which is a passage composed of the second hole 86 in the oil passage.

Therefore, when the working fluid at a high hydraulic pressure is supplied to the running clutch 70, the hydraulic pressure of the high-pressure working fluid flowing from the second hole 86 into the first hole 85 to reach the running clutch 70 can be detected speedily. On the other hand, when the working fluid is discharged from the running clutch 70, the hydraulic sensor 88 is hardly influenced by the dynamic pressure of the working fluid flowing from the first hole 85 toward the second hole 86, so that the accuracy in detection of the hydraulic pressure at the time of discharge of the working fluid from the running clutch 70 is enhanced. In addition, the hydraulic pressure sensor 88 detects the hydraulic pressure in the bent passage part 82d where the first and second holes 85 and 86 intersect, and the first hole 85 constitutes that terminal passage of the oil passage 82 which is the nearest to the running clutch 70. Therefore, variations in the hydraulic pressure in the running clutch 70 due to supply and discharge of the working fluid can be detected speedily, so that the response in detection of the hydraulic pressure condition in the running clutch 70 by the hydraulic pressure sensor 88 which detects the hydraulic pressure in the bent passage part 82d is enhanced.

As a result, the accuracy and response in detection of the hydraulic pressure condition in the running clutch 70 are enhanced, and the accuracy of monitoring the operating condition of the running clutch 70 is enhanced.

The hydraulic pressure sensor 88 is disposed in the bent passage part 82d, so that the hydraulic pressure in the bent passage part 82d can be directly detected in the bent passage part 82d. Consequently, variations in the hydraulic pressure in the running clutch 70 can be detected speedily, so that the response in detection of the hydraulic pressure condition in the running clutch 70 is enhanced. Thus, the accuracy in monitoring the operating condition of the running clutch 70 is enhanced.

Now, a mode obtained by partly modifying the above-described embodiment will be described below, the description being centered on the modified part.

The oil passage may be an oil passage having only one bent passage part 82b, 82d. In that case, the bent passage part 82b, 82d is located in the oil passage at a position nearest to the running clutch 70 serving as a supplied part.

Of the oil passage, the first hole 85, 86, 87 may be formed by drilling from the outer surface of the right cover, and the aperture end part 85a, 86a, 87a of the first hole 85, 86, 87 may be closed with the hydraulic pressure sensor 88. In this case, the aperture end part 85a, 86a, 87a of the second hole 85, 86, 87 is closed with a plug.

The supplied part may be a hydraulic operating device other than the running clutch 70, or may be a lubricated part which is supplied with a oil for lubrication.

The power unit P for driving an object of driving may not necessarily be a unit obtained by uniting an internal combustion engine E and a transmission unit as in the above-described embodiment. The power unit P may be composed of only an internal combustion engine or only a transmission unit, and may further be an engine other than an internal combustion engine.

The internal combustion engine may be a multi-cylinder internal combustion engine other than the V-type 2-cylinder internal combustion engine, or may be a single-cylinder internal combustion engine. In addition, the transmission may be a hydrostatic continuously variable transmission other than the swash plate type, or a continuously variable transmission other than the hydraulic type, or a transmission other than the continuously variable transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil passage forming member comprising:
a bent oil passage formed for conducting oil to a supplied part;
a hydraulic pressure sensor mounted for detecting hydraulic pressure in said oil passage;
said oil passage includes:
a first hole; and
a second hole intersecting said first hole to constitute a bent passage part;
one of said first hole and said second hole has an aperture end part, and said aperture end part is closed with said hydraulic pressure sensor; and
said bent passage part is a bent passage part located in said oil passage at a position nearest to said supplied part.

2. The oil passage forming member according to claim 1, wherein
said oil passage is a passage through which oil as a working fluid is supplied and discharged to and from a hydraulic operating device which is said supplied part;
said first hole constitutes a terminal passage, nearest to said hydraulic operating device, of said oil passage; and
said second hole is said one of said first hole and said second hole, said one being rectilinear in shape.

3. The oil passage forming member according to claim 1, wherein said hydraulic pressure sensor is disposed in said bent passage part.

4. The oil passage forming member according to claim 2, wherein said hydraulic pressure sensor is disposed in said bent passage part.

5. The oil passage forming member according to claim 1, wherein said bent oil passage is formed as a first bent passage part as a single member in a transmission casing and includes a second bent passage part.

6. The oil passage forming member according to claim 5, and further including a third hole extending rectilinearly and substantially parallel to the first hole.

7. The oil passage forming member according to claim 6, and further including a pressure control valve, said pressure control valve being operatively connected adjacent to the third hole.

8. The oil passage forming member according to claim 5, wherein the part where the first hole and the second hole intersect constitutes the first bent passage part and the part where the second hole and the third hole intersect constitutes the second bent passage part.

9. The oil passage forming member according to claim 1, wherein the hydraulic pressure sensor is disposed in front of the bent oil passage for detecting hydraulic pressure in the bent pressure part.

10. The oil passage forming member according to claim 1, wherein the hydraulic pressure sensor is operatively connected to the bent oil passage and includes a detection hole formed to be concentric with the second hole wherein oil flowing in the oil passage towards the first hole may flow into the detection hole whereas oil flowing towards the second hold does not influence the hydraulic pressure sensor.

11. A fluid passage forming member comprising:
a bent fluid passage formed for conducting fluid to a supplied part;
a hydraulic pressure sensor mounted for detecting hydraulic pressure in said fluid passage;
said fluid passage includes:
a first hole; and
a second hole intersecting said first hole to constitute a bent passage part;
said first hole includes an end part closed by said hydraulic pressure sensor; and
said bent passage part is a bent passage part located in said fluid passage at a position nearest to said supplied part.

12. The fluid passage forming member according to claim 11, wherein
said fluid passage is a passage through which a working fluid is supplied and discharged to and from a hydraulic operating device which is said supplied part;
said first hole constitutes a terminal passage, nearest to said hydraulic operating device, of said fluid passage; and
said second hole is said one of said first hole and said second hole, said one being rectilinear in shape.

13. The fluid passage forming member according to claim 11, wherein said hydraulic pressure sensor is disposed in said bent passage part.

14. The fluid passage forming member according to claim 12, wherein said hydraulic pressure sensor is disposed in said bent passage part.

15. The fluid passage forming member according to claim 11, wherein said bent fluid passage is formed as a first bent passage part as a single member in a transmission casing and includes a second bent passage part.

16. The fluid passage forming member according to claim 15, and further including a third hole extending rectilinearly and substantially parallel to the first hole.

17. The fluid passage forming member according to claim 16, and further including a pressure control valve, said pressure control valve being operatively connected adjacent to the third hole.

18. The fluid passage forming member according to claim 15, wherein the part where the first hole and the second hole intersect constitutes the first bent passage part and the part where the second hole and the third hole intersect constitutes the second bent passage part.

19. The fluid passage forming member according to claim 11, wherein the hydraulic pressure sensor is disposed in front of the bent fluid passage for detecting hydraulic pressure in the bent pressure part.

20. The fluid passage forming member according to claim 11, wherein the hydraulic pressure sensor is operatively connected to the bent fluid passage and includes a detection hole formed to be concentric with the second hole wherein fluid flowing in the fluid passage towards the first hole may flow into the detection hole whereas fluid flowing towards the second hold does not influence the hydraulic pressure sensor.

* * * * *